(12) United States Patent
Gu et al.

(10) Patent No.: US 8,675,075 B2
(45) Date of Patent: Mar. 18, 2014

(54) METHOD AND APPARATUS FOR MEASURING VIDEO QUALITY

(75) Inventors: Xiaodong Gu, Beijing (CN); Debing Liu, Beijing (CN); Zhibo Chen, Beijing (CN)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/811,657

(22) PCT Filed: Jul. 30, 2010

(86) PCT No.: PCT/CN2010/001150
§ 371 (c)(1),
(2), (4) Date: Jan. 22, 2013

(87) PCT Pub. No.: WO2012/012914
PCT Pub. Date: Feb. 2, 2012

(65) Prior Publication Data
US 2013/0120587 A1 May 16, 2013

(51) Int. Cl.
*H04N 17/00* (2006.01)
*H04N 5/21* (2006.01)

(52) U.S. Cl.
CPC ............. *H04N 17/00* (2013.01); *H04N 17/002* (2013.01); *H04N 5/21* (2013.01)
USPC .......................................... 348/180; 348/616

(58) Field of Classification Search
CPC ... H04N 17/00; H04N 17/004; H04N 17/002; H04N 5/21; H04N 5/2176; H04N 5/213; H04N 5/95; H04N 5/144; H04N 5/145; H04N 5/147; H04N 7/26138; H04N 5/217; G06T 2207/10016; G06T 7/0018

USPC ......... 348/180, 187, 607, 616–621, 699–701, 348/559, 497
IPC ..................... H04N 17/00,5/21, 5/14, 7/00, 5/44
See application file for complete search history.

(56) References Cited

U.S. PATENT DOCUMENTS 6,804,294 B1 * 10/2004 Hartung et al. .......... 375/240.12

FOREIGN PATENT DOCUMENTS

| CN | 1568011 | 1/2005 |
| CN | 101411208 | 4/2009 |

(Continued)

OTHER PUBLICATIONS

Search Report Dated Apr. 28, 2011.

(Continued)

*Primary Examiner* — Sherrie Hsia
(74) *Attorney, Agent, or Firm* — Robert D. Shedd; Jeffrey M. Navon

(57) ABSTRACT

A method and apparatus for measuring the quality of a video sequence, which includes a plurality of frames, among which one or more consecutive frames are lost, wherein during the displaying of the video sequence, the one or more lost frames are substituted by an immediate preceding frame in the video sequence during a period from the displaying of the immediate preceding frame to that of an immediate subsequent frame of the one or more lost frames, the method includes measuring the quality of the video sequence as a function of a first parameter (DF) relating to the stability of the immediate preceding frame during the period, a second parameter (DD) relating to the continuity between the immediate preceding frame and the immediate subsequent frame, and a third parameter (DP) relating to the coherent 20 motions of the video sequence.

11 Claims, 4 Drawing Sheets

(56) References Cited

FOREIGN PATENT DOCUMENTS

| | | |
|---|---|---|
| CN | 101416524 | 4/2009 |
| WO | WO2007117711 | 10/2007 |
| WO | WO2007118160 | 10/2007 |

OTHER PUBLICATIONS

Yang, Kai-Chieh, et al. "Perceptual temporal quality metric for compressed video." Multimedia, IEEE Transactions on 9.7 (2007): 1528-1535.

Huynh-Thu, Quan, et al, "Impactt of jitter and jerkiness on perceived video quality," Second Int'l Workshop on Video Processing and Quality Metrics for Consumer Electronics (VPQM-06), Scottsdale, Arizona. 2006.

Qi, Yining, et al. "The effect of frame freezing and frame skipping on video quality," Intelligent Information Hiding and Multimedia Signal Processing, 2006. IIH-MSP'06. International Conference on. IEEE, 2006.

Duan, Ling-Yu, et al. "Shot-level camera motion estimation based on a parametric model." Proceedings of the TREC Video Retrieval Evaluation Online Proceedings (2005).

\* cited by examiner

METHOD AND APPARATUS FOR MEASURING VIDEO QUALITY

This application claims the benefit, under 35 U.S.C. §365 of International Application PCT/CN2010/001150, filed Jul. 30, 2010, which was published in accordance with PCT Article 21(2) on Feb. 2, 2012 in English.

FIELD OF THE INVENTION

This invention generally relates to video quality, and in particular, to a method and an apparatus for measuring the quality of a video sequence distorted by frame loss.

BACKGROUND

It should be noted that this section is intended to introduce various aspects of art to the reader, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Due to the rapid development of wireless communication technologies, video communication using video phones, video streaming and video broadcasting is becoming more and more popular. In such kind of communication process, packets of compressed media data may be transmitted over unstable networks, during which period spatial and temporal distortions may be introduced by either data loss in compression or packet loss in transmission. Bit rate adaptation techniques and packet loss in a network could be the origin of a perceived video quality degradation. At the source coding stage, temporal down-sampling is one of the techniques employed for bit rate adaptation, in which the sequences undergoes a frame dropping operation that affects the motion continuity of the video.

A perceptual jitter is a common video quality degradation caused by frame loss. Generally speaking, the perceptual jitter is a kind of temporal artifact perceived in the case that one or more consecutive frames in a video frame sequence are lost during video streaming and then at the subsequent displaying stage are substituted by the last correctly received frame. FIG. 1 is an exemplary diagram showing a perceptual jitter caused by frame loss, such as frame dropping or discarding. The frame loss process and its influence on video quality are shown in FIG. 1. The line in FIG. 1 represents the moving trajectory of an object, where the X-axis is time and the Y-axis is the object position. The frames between time B0 and time B are dropped. In this case, since the last correctly received frame at the time B0 will be displayed till a new frame is correctly received at the time B, the displayed object will keep still during this period and then jump immediately to a new position. If this period is relative short and the object movement is slight, a viewer is able to guess what the object is doing and will not perceive a motion discontinuity. Otherwise, human brain of the viewer will fail to conceal the "motion discontinuity" phenomenon, which will make the viewer recognize this temporal artifact.

Some studies have been done to evaluate the perceptual impact of temporal degradations caused by perceptual jitters. Based on specific subjective tests described in the prior art[1], it was concluded that a perceptual quality decreases with the increase of the number of dropped frames. The above conclusion is extended by the study made by the prior art[2] to a conclusion that perceptual impact is highly content dependent. The conclusion in the prior art[3] is similar to the above two prior arts but specifies that the depended content factor to be motion activity—video with low motion activity does not suffer in perceptual quality quite as much in the presence of jitters as does high motion activity video. A quantitative model is also proposed based on the above assumptions.

However there is no systematic evaluation scheme available for perceptual jitter yet.

SUMMARY OF THE INVENTION

The inventors' study shows that when one or more consecutive frames in a video sequence comprising of a plurality of frames are lost and at the subsequent displaying stage substituted by an immediate preceding frame in the video sequence during a period from the displaying of said immediate preceding frame to that of an immediate subsequent frame of said one or more lost frames, the quality of the distorted video sequence will mainly be influenced by the following three parameters: a parameter relating to the stability of said immediate preceding frame during said period, a parameter relating to the continuity between said immediate preceding frame and said immediate subsequent frame, and a parameter relating to the coherent motions of the video sequence.

In view of the above, the present invention provides a method and an apparatus for measuring video quality of the video sequence distorted by frame loss as a function of the above three parameters.

One aspect of the invention provides a method for measuring the quality of a video sequence comprising of a plurality of frames, among which one or more consecutive frames are lost, wherein during the displaying of the video sequence, said one or more lost frames are substituted by an immediate preceding frame in the video sequence during a period from the displaying of said immediate preceding frame to that of an immediate subsequent frame of said one or more lost frames. The method comprises: measuring the quality of the video sequence as a function of a first parameter relating to the stability of said immediate preceding frame during said period, a second parameter relating to the continuity between said immediate preceding frame and said immediate subsequent frame, and a third parameter relating to the coherent motions of the video sequence.

Another aspect of the invention provides an apparatus for measuring the quality of a video sequence comprising of a plurality of frames, among which one or more consecutive frames are lost, wherein during the displaying of the video sequence, said one or more lost frames are substituted by an immediate preceding frame in the video sequence during a period from the displaying of said immediate preceding frame to that of an immediate subsequent frame of said one or more lost frames. The apparatus comprises: a first measurement unit adapted to obtain a first parameter relating to the stability of said immediate preceding frame during said period; a second measurement unit adapted to obtain a second parameter relating to the continuity between said immediate preceding frame and said immediate subsequent frame; a third measurement unit adapted to obtain a third parameter relating to the coherent motions of the video sequence; and a combination unit adapted to obtain the result of the quality of the video sequence as a function of the first parameter, the second parameter and the third parameter.

Advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in.

DETAILED DESCRIPTION OF THE INVENTION

An embodiment of the present invention will be described with reference to a video streaming system. According to the embodiment, when one or more consecutive frames in a video sequence are lost during streaming and substituted by the last correctly received frame in displaying before a subsequent frame in the video sequence is correctly received, a perceptual jitter of the video sequence will be influenced by the following three aspects:

1) Frame freeze: an effect caused by the last correctly received frame keeping static/freeze during the period from the displaying of the last correctly received frame to that of the subsequent frame when one or more consecutive frames are lost.

2) Motion discontinuity, an effect that an object movement becomes discontinuous due to the discontinuity between the last correctly received frame and the subsequent frame during the above mentioned period. For example, when a viewer focuses on a basketball of a video, the motion discontinuity means that the basketball disappears for a short period and then suddenly appears in another place.

3) Psychological jerk, an effect caused by coherent motions, especially camera motions. Specifically, when one or more consecutive frames are lost in a fast panning scenario, viewer perception will be decreased greatly since both eyes and brain will become tired quickly for great amount of psychological actions happened.

In view of the above, the embodiment of the invention proposes to measure the perceptual jitter of the distorted video sequence as a function of three parameters respectively relating to the above three effects.

One aspect of the embodiment of the invention provides a method for measuring a perceptual jitter of a video sequence distorted by frame loss.

Figure 2:
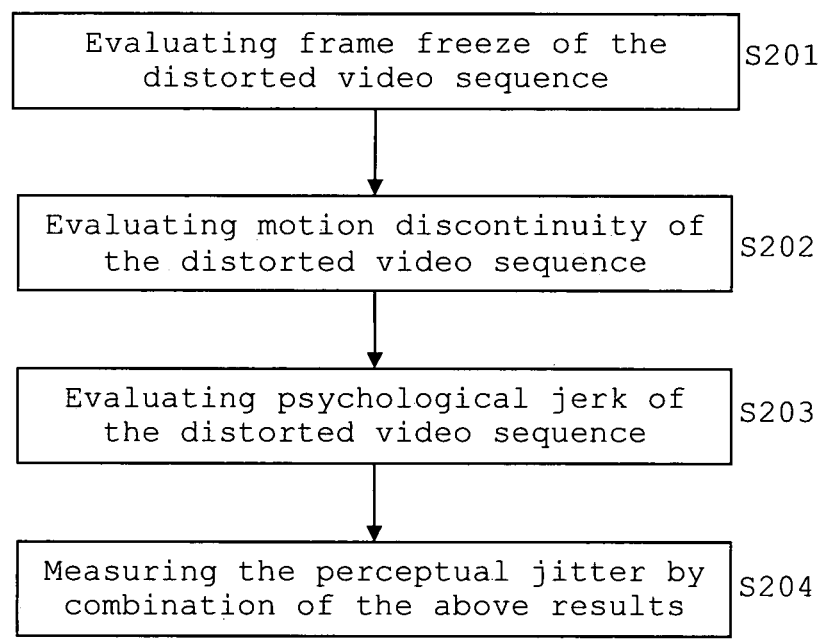
FIG. 2 is a flow chart showing the workflow of a method for measuring a perceptual jitter of a video sequence distorted by frame loss according to an embodiment of the present invention.

FIG. 2 is a flow chart showing the workflow of the method for measuring a perceptual jitter of a video sequence distorted by frame loss.

As shown in FIG. 2, the method comprises the following steps:

S201: Evaluating the frame freeze of the video sequence distorted by frame loss;

S202: Evaluating the motion discontinuity of the video sequence distorted by frame loss;

S203: Evaluating the psychological jerk of the video sequence distorted by frame loss;

S204: measuring the perceptual jitter of the video sequence by the combination of the results of the three preceding steps.

According to a variant, the step S204 combines two results selected from the above three results other than all of them.

Another aspect of the embodiment of the invention provides an apparatus for measuring a perceptual jitter of a video sequence distorted by frame loss.

According to the embodiment of the invention, firstly each of the above three effects will be separately evaluated by the apparatus, and then the overall perceptual jitter measurement result will be obtained by the combination of the three separate results.

Figure 3:
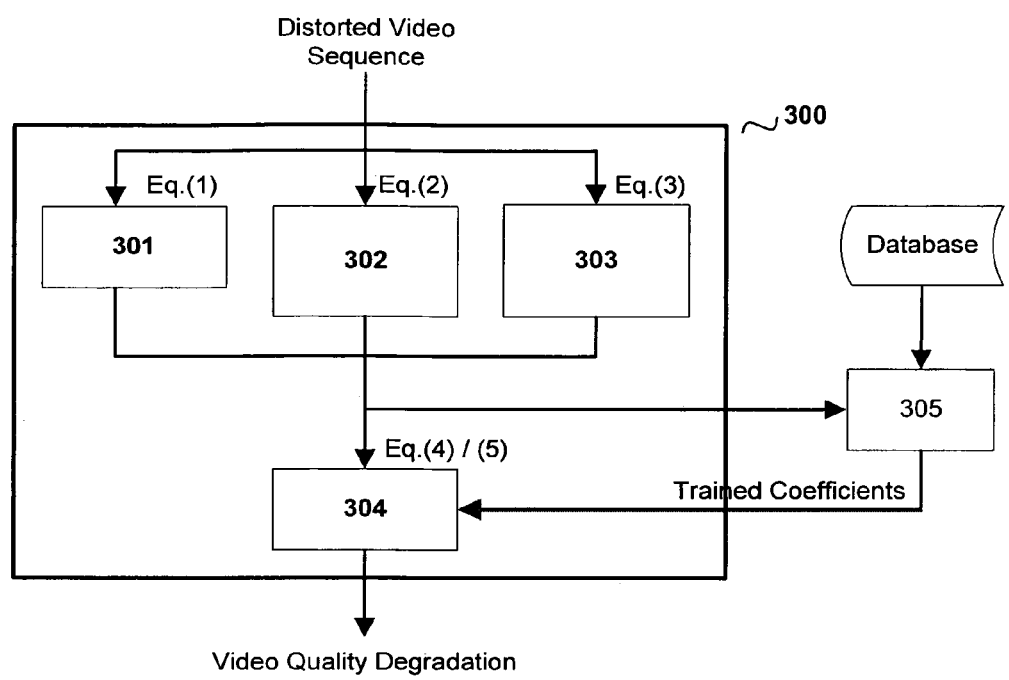
FIG. 3 is a high-level block diagram of the apparatus for measuring a perceptual jitter of a video sequence distorted by frame loss according to an embodiment of the present invention.

FIG. 3 is a high-level block diagram of an apparatus 300 for measuring a perceptual jitter of the video sequence. As shown in FIG. 3, the input of the apparatus 300 is a distorted video sequence having one or more consecutive frame loss, and the output thereof is a value indicating the quality degradation level caused by one or more consecutive frame loss in the distorted video sequence, which is the perceptual jitter in this case.

The apparatus 300 comprises: a frame freeze evaluation module 301 for receiving the distorted video sequence and evaluating the perceptual jitter of the video sequence caused by frame freeze; a motion discontinuity evaluation module 302 for receiving the distorted video sequence and evaluating the perceptual jitter of the video sequence caused by motion discontinuity; a psychology jerk evaluation module 303 for receiving the distorted video sequence and evaluating perceptual jitter of the video sequence caused by psychology jerk; and a combination module 304 for receiving outputs from modules 301, 302 and 303 and combining these outputs to an overall perceptual jitter measurement result caused by frame loss.

Next, a detailed description to the operation of the apparatus 300 will be given.

Firstly, some notifications will be given below:

In the following description to the embodiment, denote the original video sequence $V=\{f_1, f_2, \ldots, f_N\}$. Suppose frames $f_{k+1}, f_{k+2}, \ldots, f_{m-1}$ are lost during transmission, denote the streamed video sequence/distorted video sequence $V'=\{f_1', f_2', \ldots, f_N'\}$ Wherein $$\begin{cases} f_i' = f_k & k+1 \leq i \leq m-1 \\ f_i' = f_i & \text{otherwise} \end{cases}$$

In short, the apparatus 300 is used to evaluate the level of temporal quality degradation between frames $f_k'$ and $f_m'$ in the distorted video sequence when the frames of the original sequence are lost.

In the following description, denote FPS the frame rate, and denote T=(m−k)/FPS the time period between $f_k'$ and $f_m'$ during which the displaying content keeps static. Denote $MV_{i,x,y}$ the motion vector of macro-block indexed with (x, y) in the i-th frame of the video sequence V.

1. Frame Freeze Evaluation Module 301

According to an embodiment of the invention, the frame freeze evaluation module 301 can measure the perceptual jitter of the video caused by frame freeze by the following equation (1):

$$D_F = g_1(MV) \times g_2 \tag{1}$$

It can be appreciated that a viewer will not recognize the frame freeze in an extremely static video sequence with very low motion. In the above equation (1), $g_1(MV_k)$ is used to identify this case where $MV_k$ is the measurement of the motion vectors of the k-th frame of the video sequence V.

$$g_1(MV_k) = \begin{cases} 0 & MV_k < c_1 \\ 1 & \text{otherwise} \end{cases}$$

In the equation (1), $g_2(T)$ is used to identify the time period of the frame freeze T which is an important factor in the evaluation of the perceptual effect caused by frame freeze.

$$g_2(T) = \begin{cases} 0 & T < c_2 \\ \dfrac{T - c_2}{c_3 - c_2} & c_2 \le T \le c_3 \\ 1 & T > c_3 \end{cases}$$

As shown above, if the time period is smaller than a constant ($T<c_2$), a human brain will try to connect the images before and after the frame-freeze, which will explain this period into a continuous movement. In that case the viewer will not recognize the frame freeze itself.

2. Motion Discontinuity Evaluation Module 302

In a video browsing, the eye movements of a viewer can be mainly decomposed into three types: saccade, fixation and smooth pursuit. A saccade is a very rapid eye movement allowing a viewer to explore the visual field. A fixation is a residual movement of the eye when the gaze is fixed on a particular area of the visual field. A pursuit movement is the ability of the eyes to smoothly track the image of a moving object.

A viewer learns information mainly from the fixation/smooth pursuit stage. In these stages, human eyes are focus on the small area of an interesting object. When a frame loss happens, human eyes keep still until a new frame correctly transmitted. It is then appreciated that the more different in pixel values of the currently focused areas, the easier to notice the motion discontinuity.

According to the above explanation, the motion discontinuity evaluation module 302 can evaluate the perceptual jitter caused by motion discontinuity by the following equation (2)

$$D_D = \frac{1}{255} \sqrt{\frac{\sum_i (p_{i,m} - p_{i,k})^2}{N}} \qquad (2)$$

Wherein N is the number of pixels, $p_{i,j}$ denotes the pixel value of the ith pixel in frame $f_i'$.

3. Psychology Jerk Evaluation Module 303

Unlike the effect of motion discontinuity which is caused by object movement, the effect of psychological jerk is caused by global camera motion.

Figure 1:
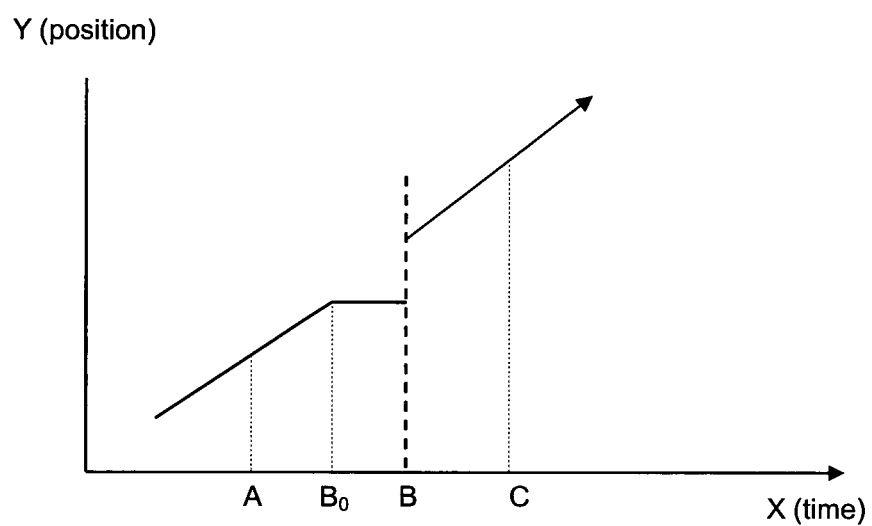
FIG. 1 is an exemplary diagram showing a perceptual jitter caused by frame dropping or discarding.

As described above with reference to FIG. 1, when the frames between time B0 and B are lost, the frame at time B0 will keep still until a new frame at time. B is transmitted. However, what a viewer perceives is not exactly like this. When the video content suddenly becomes still at time B0, viewer brain will try to explain the object movement with a same speed before time B0 and to connect the content at time B0 and B naturally. When the time period between B0 and B is short, the brain succeeds according to "apparent movement theory". Otherwise it fails. No matter whether human brain succeeds or fails in the explanation, a lot of psychological activities occur.

When frame loss happens in a video sequence with global camera motion, each pixel of the video sequence requests this kind of psychological activities. As a result, viewer is easier to feel tired and unhappy when counting this kind of artifact. This kind of effect is called "psychological jerk" in the present invention and will be evaluated by the level of camera motion.

The prior art[4] describes a so-called eight-parameter perspective motion model which can be used in the global motion estimation described above.

$$x_i' = (a_0 + a_2 x_i + a_3 y_i)/(1 + a_6 x_i + a_7 y_i)$$

$$y_i' = (a_1 + a_4 x_i + a_5 y_i)/(1 + a_6 x_i + a_7 y_i)$$

Wherein ($a_0, \ldots, a_7$) are the global motion parameters, ($x_i, y_i$) denotes the spatial coordinates of the ith pixel in the current frame, and ($x_i', y_i'$) denotes the coordinates of the corresponding pixel in the previous frame. The relationship between motion model parameters and symbol-level interpretation is established as follows:

Pan=$a_0$

Tilt=$a_1$

Zoom=$(a_2+a_5)/2$

With the help of the above algorithms, the psychology jerk evaluation module 303 can evaluate the perceptual jitter of the video caused by frame freeze by the following equation (3):

$$D_P = \frac{1}{c_4}(\beta_1 \times \text{Pan} + \beta_2 \times \text{Tilt} + \beta_3 \times \text{Zoom}) \qquad (3)$$

Wherein $c_4$ is a coefficient to normalize the value into range [0, 1].

Different weighting coefficient can be applied to different camera operations (pan, tilt and zoom) because these camera operations have different kinds of influence in perceptual jitter.

4. Combination Module 304

Evaluation outputs from modules 301, 302 and 303 will be combined by the combination module 304 to get an overall perceptual jitter measurement result.

As an example, a linear combination can be used by the combination module 304 to get the overall perceptual jitter measurement result. The linear combination can be described by the following equation (4):

$$J_1 = k_1 \times D_F + k_2 \times D_D + k_3 \times D_P \qquad (4)$$

Wherein the three coefficients $k_1$, $k_2$ and $k_3$ are determined by experiment.

A dataset DS=$\{s_i | i=1, 2, \ldots, M\}$ is collected by subjective test descript. Each sample $s_i$ in the dataset is a transmitted video shot with frame loss. $D_F(i), D_D(i), D_P(i)$ denote the perceptual feeling evaluation of frame freeze, motion discontinuity and psychological jerk of $s_i$ respectively.

Suppose $J_1(i)$ denotes the objective evaluation of perceptual jitter for sample $s_i$ according to expression (4), $J_s(i)$ denotes the subjective score of the perceptual jitter for the sample $s_i$. Then the coefficients $k_1$, $k_2$ and $k_3$ can be determined by the following equation:

$$\min_{k_1 k_2 k_3} \Sigma_i (k_1 \times D_F(i) + k_2 \times D_D(i) + k_3 \times D_P(i) - J_s(i))^2$$

Alternatively, a machine learning can also be applied to get the overall perceptual jitter measurement result. That is, supposing $D_F$, $D_D$ and $D_P$ are the extracted features and then the overall evaluation of perceptual jitter is the machine output. In this case, an Artificial Neural Network (ANN) can be adopted as a training machine 305 shown in FIG. 3, which can be expressed as below.

$$J_2 = ANN(D_F, D_D, D_P) \quad (5)$$

In the combination module 304, some coefficients are required as a weighted value indicating the viewer's different sensitivity to frame freeze, motion discontinuity and psychology jerky. A default set of values of these coefficients are provided by training on the dataset. However, for different persons, different application scenarios these values can be modified.

Figure 4:
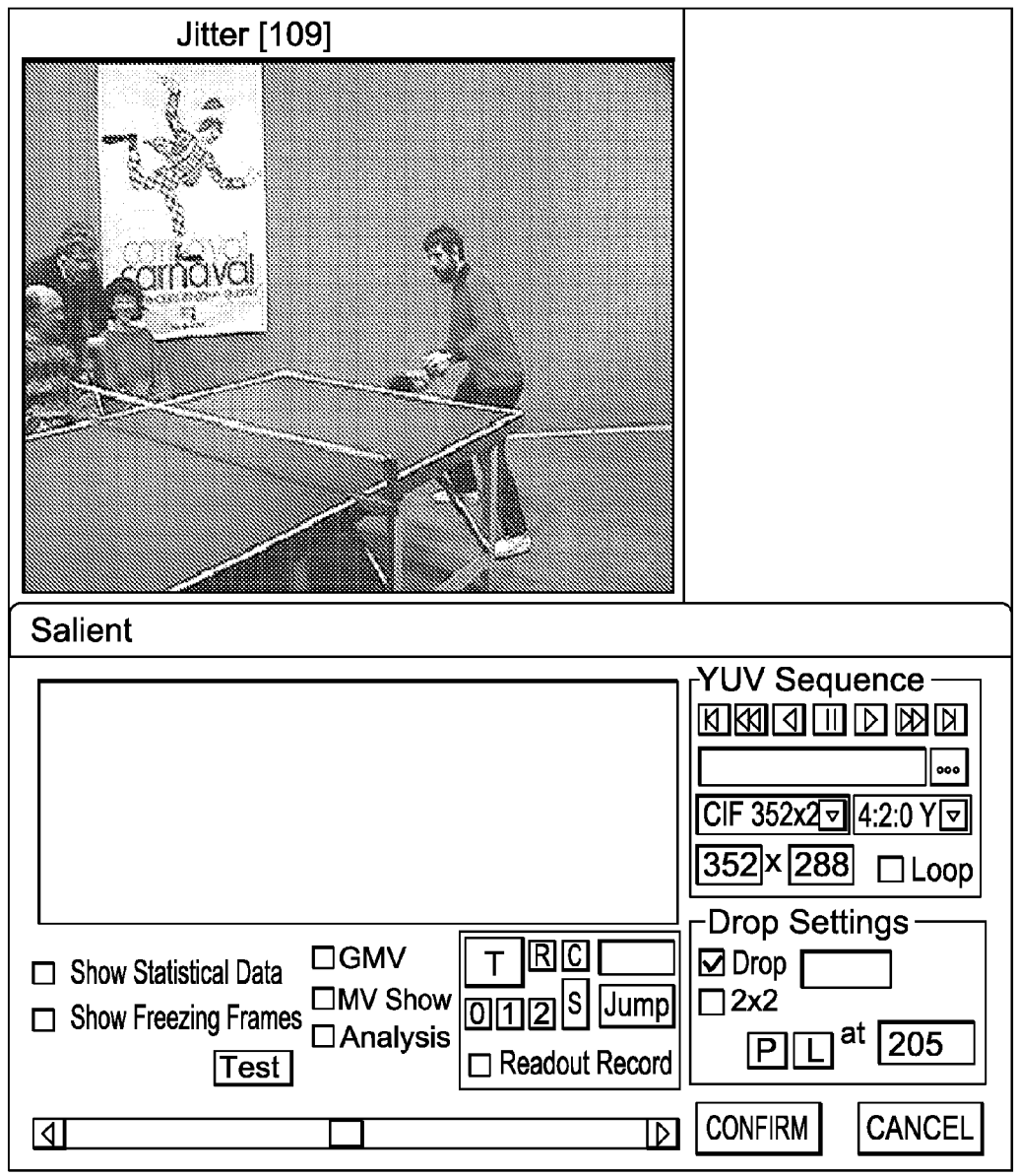
FIG. 4 is a diagram showing the interface of a software tool that is designed to have a subjective test of a video quality.

FIG. 4 is a diagram showing the interface of a software tool that is designed to have a subjective test of the quality of a video sequence. As shown in FIG. 3, a random clip from a video sequence is displayed with a continuous frame loss at a random position of the sequence and with a random length.

The viewer is required to mark the perception of jitter as follows:
0—no perceived quality degradation;
1—quality degradation can be recognized, but not very annoying;
2—clear quality degradation, very annoying.

The subjective score is denoted by J. All the sequence with the marked score composed the dataset DS.

Next, parameter setting for the subjective test will be described.

In the test, the constant numbers are determined experientially. $\beta_1 = \beta_2 = 1, \beta_3 = 2$; $c_1 = 1$; $c_2 = \frac{1}{15}(s), c_3 = \frac{1}{3}(s)$.

A default value is assigned to each of the $k_i$, $k_2$ and $k_3$ in the evaluation of $J_1$ and the training machine parameters in the evaluation of $J_2$ according to the subjective test.

However, the perceptual feelings of frame freeze, motion discontinuity and psychological jerk may be quite different and independent. That is, some people may be very sensitive to psychological jerk while some others may dislike the motion discontinuity of his focused object. Therefore, the contribution of the perceptual feeling of frame freeze, motion discontinuity and psychological jerk to the overall evaluation of perceptual jitter may be quite different in different application scenario and for different person.

For flexibility, a set of configurations is provided for these parameters in an average manner. But these value settings can be changed.

As described above, a linear combination or a machine learning can be used by the combination module 304 to get the overall perceptual jitter evaluation result. The prediction accuracies of the above two options are measured by comparing the objective evaluation result ($J_1/J_2$) with the subjective score $J_s$. Pearson Correlation can be used for such prediction accuracy measurement.

The below table gives the Pearson Correlation (prediction accuracy) of the present invention and the method proposed in the prior art 3. The prediction accuracies were tested with 200 samples (2 viewers).

| | |
|---|---|
| Algorithm proposed in prior art 3 | 0.52 |
| $J_1$ of the invention | 0.70 |
| $J_2$ of the invention | 0.73 |

"Pausing with skipping" is a normal play mode in unstable network condition, which is defined as events where the video pauses for some period of time and then restarts with some loss of video information. One example of pausing with skipping is a pair of IP Videophones, where heavy network traffic causes the IP Videophone display to freeze briefly; and some content has been lost when the IP Videophone display continues. Another example is a video conferencing system that performs constant frame skipping or variable frame skipping. A processed video sequence containing pausing with skipping will be approximately the same duration as the associated original video sequence. [—referenced from VQEG MM Test Plan]

The proposed perceptual jitter measurement method and apparatus can be applied directly to number the introduced quality degradation at any "pausing with skipping".

And we can also adaptively select frames to be dropped in bandwidth limited conditions while minimize the introduced quality degradation with the help of the proposed algorithm. The temporal importance of each frame in the video sequence can be measured by setting the number of lost frames to be a constant.

The foregoing merely illustrates the embodiment of the invention and it will thus be appreciated that those skilled in the art will be able to devise numerous alternative arrangements which, although not explicitly described herein, embody the principles of the invention and are within its spirit and scope.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

[1] Y. N. Qi, M. Y. Dai, "The Effect of Frame Freezing and Frame Skipping on Video Quality", 2006 International Conference on Intelligent Information Hiding and Multimedia, pp. 423-426.

[2] M. Ghanbari, Q. Huynh-Thu, "Impact of Jitter and Jerkiness on Perceived Video Quality", 2nd International Workshop on Video Processing and Quality Metrics for Consumer Electronics, Scottsdale, USA, 22-24, Jan. 2006

[3] K. C. Yang, C. C. Guest, K. El-Maleh, P. K. Das, "Perceptual Temporal Quality Metric for Compressed Video", IEEE Transaction on Multimedia, Vol. 9, No. 7, November 2007, pp. 1528-1535.

[4] L. Y. Duan, J. Q. Wang et al., "Shot-Level Camera Motion Estimation based on a Parametric Model"

The invention claimed is:

1. A method for measuring the quality of a video sequence comprising of a plurality of frames, among which one or more consecutive frames are lost, wherein during the displaying of the video sequence, said one or more lost frames are substituted by an immediate preceding frame in the video sequence during a period from the displaying of said immediate preceding frame to that of an immediate subsequent frame of said one or more lost frames, wherein the method comprises:
measuring the quality of the video sequence as a function of a first parameter ($D_F$) relating to the stability of said immediate preceding frame during said period, a second parameter ($D_D$) relating to the continuity between said immediate preceding frame and said immediate subsequent frame, and a third parameter ($D_P$) relating to the coherent motions of the video sequence.

2. Method according to claim 1, wherein the quality of the video sequence is measured as a linear combination ($K_1 \times D_F + K_2 \times D_D + K_3 \times D_P$) of the first parameter ($D_F$), the second parameter ($D_D$) and the third parameter ($D_P$),
wherein coefficients of the linear combination ($K_1$, $K_2$ and $K_3$) are determined by experiment.

3. Method according to claim 1, wherein the quality of the video sequence is measured by a machine learning of the first parameter ($D_F$), the second parameter ($D_D$) and the third parameter ($D_P$).

4. Method according to claim 1, wherein the first parameter $D_F$ is determined as a function of the motion vector of said immediate preceding frame and the length of said period.

5. An apparatus, said apparatus being able to execute the method according claim 4.

6. Method according to claim 1, wherein the second parameter $D_D$ is determined as a function of the pixel values and pixel numbers of said immediate preceding frame and said immediate subsequent frame.

7. Method according to claim 1, wherein the coherent motion is a camera motion during the generation of the video sequence by a camera.

8. Method according to claim 7, wherein the camera motion comprises pan, tilt and zoom operations of the camera during the generation of the video sequence.

9. An apparatus for measuring the quality of a video sequence comprising of a plurality of frames, among which one or more consecutive frames are lost, wherein during the displaying of the video sequence, said one or more lost frames are substituted by an immediate preceding frame in the video sequence during a period from the displaying of said immediate preceding frame to that of an immediate subsequent frame of said one or more lost frames, wherein the apparatus comprises:

a first measurement unit adapted to obtain a first parameter ($D_F$) relating to the stability of said immediate preceding frame during said period;

a second measurement unit adapted to obtain a second parameter ($D_D$) relating to the continuity between said immediate preceding frame and said immediate subsequent frame;

a third measurement unit adapted to obtain a third parameter ($D_F$) relating to the coherent motions of the video sequence; and a combination unit adapted to obtain the result of the quality of the video sequence as a function of the first parameter ($D_F$), the second parameter ($D_D$) and the third parameter ($D_P$).

10. Apparatus according to claim 9, wherein the combination unit obtains the result of the quality of the video sequence by a linear combination ($K_1 \times D_F + K_2 \times D_D + K_3 \times D_P$) of the first parameter ($D_F$), the second parameter ($D_D$) and the third parameter ($D_P$), and wherein coefficients of the linear combination ($K_1$, $K_2$ and $K_3$) are determined by experiment.

11. Apparatus according to claim 9, wherein the combination unit obtains the result of the quality of the video sequence by a machine training of a training machine on the first parameter (DF), the second parameter (DD) and the third parameter (DP).

* * * * *